Patented Apr. 29, 1947

2,419,796

UNITED STATES PATENT OFFICE 2,419,796

ALKYLATION PROCESS

Walter A. Schulze, Bartlesville, Okla., assignor to Phillips Petroleum Company, a corporation of Delaware No Drawing. Application July 13, 1942,
Serial No. 450,801

9 Claims. (Cl. 260—671)

This invention relates to the production of alkyl-substituted benzene and benzene homologs by catalytic alkylation with unsaturated hydrocarbons in the presence of solid contact catalysts. More specifically, this invention relates to an improved process for the production of ethylated benzene derivatives by the selective alkylation of the benzene nucleus with ethylene.

The alkylation of aromatic hydrocarbons wherein an alkyl, cycloalkyl, or aralkyl group is introduced into the aromatic nucleus has long been known and has been practiced with a variety of so-called Friedel-Crafts catalysts and strong mineral acid condensing agents. While classical procedures employed alkylating agents in the form of alkyl halides, alcohols, etc., the present tendency is to employ olefins directly and to conduct the reaction in the form of a simplified catalytic combination. This development, with consequent economic benefits, has greatly altered the classical concept of the alkylation mechanism and of the necessity for employing the heretofore preferred condensing agents.

For example, with aluminum chloride, the typical Friedel-Crafts agent, the quantities of condensing agent required so far exceed normal catalytic proportions that the chemical costs and aluminum chloride sludge formation have been excessive in view of the yields obtained. Other suggested catalysts or promoters such as iron, zinc, tin, and titanium halides suffer the same disadvantages. The use of strong mineral acids, such as sulfuric and phosphoric, as condensing agents has also been described, but these agents also are relatively non-selective and introduce undesirable side reactions. Thus, all of these materials are capable of promoting olefin polymerization and have required careful regulation of reaction conditions, particularly temperature, to maintain alkylation as the predominant reaction. Even with precautions, poor yields, high catalyst consumption, and non-selective alkylation have usually resulted.

While the use of liquid acids or acid solutions may be necessary or desirable in certaain applications, the use of liquid catalysts introduces the problem of maintaining contact between immiscible hydrocarbon and non-hydrocarbon phases, and subsequently separating and recovering said phases essentially uncontaminated. Catalyst recovery operations and purification of the hydrocarbon products may tend to increase operating costs. Also, when corrosive materials are handled, special equipment and corrosion-resistant alloys are involved and investment costs may be high. On the other hand, when the solid catalysts disclosed hereinafter are employed in the form of beds of contact masses of suitable particle size, the operating procedures are much simpler and more economical. Thus, with solid contact catalysts, the reactant fluids may be passed into reaction zones containing said catalysts and withdrawn therefrom in such a manner that the desired intimacy of contact, the reaction time, and other reaction conditions may be essentially governed by adjusting the flow rate, temperature, and composition of the reactants.

It is an object of this invention to provide an improved process for the alkylation of aromatic hydrocarbons with olefin alkylating agents. Another object of this invention is to provide an improved process for the alkylation of benzene with ethylene in which a novel type of solid alkylation catalyst is employed. Still another object of this invention is to provide an improved process for the synthesis of ethylbenzene in the presence of solid adsorbent contact catalysts and under conditions such that alkylation proceeds smoothly and mono-ethylbenzene predominates in the reaction products. The process disclosed is of particular value in the manufacture of substantially pure ethylbenzene, which is a desirable constituent of aviation fuels and which also is a raw material for the production of styrene.

It has now been found that the alkylation reaction, typified by the formation of ethylbenzene from benzene and ethylene, is smoothly effected in the presence of solid adsorbent catalysts comprising silica and a metal oxide, preferably in the form of synthetically prepared silica gel promoted by relatively minor proportions of the metal oxide. Such catalysts have heretofore been used to promote olefin polymerization and various high temperature cracking reactions, but the process of the present invention involves a novel adaptation in the field of cyclic or aromatic hydrocarbon synthesis. The preferred reaction conditions disclosed herein, the clean cut nature of the alkylation reaction over the specific silica-metal oxide catalysts, and the absence of strong acids commonly employed in so-called "acid alkylation" represent a distinct improvement over conventional alkylation procedures.

The process of the present invention comprises the contacting of controlled proportions of aromatic hydrocarbon and ethylene with an adsorbent silica-metal oxide gel-type catalyst under alkylating conditions chosen so as to produce a satisfactory degree or even substantially complete conversion of the ethylene. The hydrocarbon feed mixture may be passed continuously through a stationary bed of granular catalyst, or otherwise contacted with the solid catalyst, and the catalyst effluent may be either continuously or intermittently fractionated to recover alkylate from unconverted feed components. Subsequent fractionation may be employed to remove minor amounts of poly-alkylated product from the mono-alkylate. Ordinarily, an excess of aromatic hydrocarbon should be present in the feed, and unconverted aromatic compound may be returned to the catalyst with additional quantities of the olefin alkylating agent. The molar ratio of benzene to ethylene is preferably substantially greater than 1:1.

In the more specific preferred embodiment of the invention, benzene in admixture with the desired molar proportion of ethylene is contacted at an operating pressure such as to maintain a substantial amount of liquid phase, generally in the range of about 100 to 2000 pounds gage, at a temperature in the catalyst space of from about 400 to about 700 F., with a bed of granular silica-metal oxide gel catalyst. The reactant flow rate and therefore the contact time within the catalyst space is usually chosen so to permit extensive reaction of the ethylene, so that the liquid product from the catalyst comprises mainly unconverted benzene and ethylbenzene, sometimes together with some diethylbenzene. These products are then separated in conventional fractionating equipment, and the benzene is returned to the charge source if desired. When the total alkylate may be used, the final fractionation may, of course, be eliminated. However, in most instances, the mono-alkylate is the most valuable product, and segregation may be correspondingly thorough. At higher temperatures, high pressures often result in a dense phase which gives most of the benefits of liquid phase operation even though the temperatures are above the critical for the mixture treated. If desired, true liquid phase operation may be secured by adding a heavier inert hydrocarbon material having a sufficiently high critical temperature.

Operation according to this scheme may be either batch-wise or continuous, with the latter usually preferred. If desired, a plurality of catalyst cases may be provided so that a batch of catalyst may be replaced without interrupting operation of the process. Other means of introducing the ethylene, or ethylene-containing mixtures, to the reaction zone may be employed. For example, ethylene may be added at one or more points directly into the catalyst chamber, or such multipoint addition may be utilized to maintain a predetermined low ethylene concentration at various points within the catalyst space. Olefin-concentration control may also be effected by recirculating a substantial, unseparated portion of the effluent, with addition of reactants only at a single point in the cycle. Temperature control within the catalyst space may be obtained by regulation of feed preheating means, or heat exchange devices may be provided within or about the catalyst.

The solid adsorbent catalysts which are a feature of the present process are most accurately described as dried gels, and are characterized by their chemical composition, their physical properties, and specific methods of preparation which account for their catalytic activity. Although these catalysts are broadly referred to as silica-metal oxide compositions, it is important to further define the origin, physical structure, and chemical composition in order to differentiate the catalysts active in the present process from naturally occurring minerals which contain some of the same components but which have distinctly different catalytic properties under the terms of this invention. The preferred catalysts of this invention are of such a nature that it is possible to choose conditions for the present process which provide excellent selectivity toward alkylation without incurring extensive olefin polymerization. Thus the temperatures employed for alkylation with ethylene are ordinarily below those supporting active polymerization, while if less active catalysts are employed at higher temperatures, the extent of polymerization may be greatly increased with consequent losses of reactants and contamination of alkylated products.

The natural and synthetic metal silicates, particularly aluminum silicates, were originally studied with regard to their polymerizing qualities, and it was noted that catalysts of superior activity resulted from synthetic preparations involving formation of the oxides in gel form and not necessarily in the proportions found in nature. It was also noted that when the gel structure was not produced or was destroyed that the physical and catalytic properties of the material were usually unsatisfactory. Suitable silica-alumina catalysts have been prepared by the methods described by McKinney in U. S. Patents 2,142,324 and 2,147,985 and employed in polymerization of gaseous olefins. The present invention enables the use of similar silica gel catalysts activated with alumina and/or other metal oxides at temperatures and/or pressures appreciably below those initiating rapid polymerization of the particular olefin alkylating agent.

In general, these catalysts are prepared by first forming a hydrous silica gel or jelly from an alkali-silicate and an acid, washing soluble material from the gel, treating or activating the gel with an aqueous solution of a suitable metal salt, and subsequently washing and drying the treated material. In this manner, a part of the metal, presumably in the form of a hydrous oxide or loose hydroxide compound formed by hydrolysis is selectively adsorbed by the hydrous silica, and is not removed by subsequent washing. This selective adsorption is attested by a decrease in the metal content of the activating solution as well as a decrease in pH as the activation progresses. The most often used catalyst of this type, at present, is a silica-alumina catalyst, prepared by treating a wet or partially dried hydrous silica gel with an aluminum salt solution, such as a solution of aluminum chloride or sulfate, and subsequently washing and drying the treated material. However, catalysts of a very similar nature but differing among themselves as to one or more specific properties, may be prepared by using, instead of an aluminum salt, a hydrolyzable salt of a metal selected from group IIIB or from group IVA of the periodic system, and may be referred to in general as "silica-alumina type" catalysts. More particularly, salts of indium and thallium in addition to aluminum in group IIIB may be used, and salts of titanium, zirconium and thorium in group IVA may be used to treat silica gel and to prepare catalysts of this general type. Boron in the form of boric acid, or a soluble borate such as sodium borate, may be incorporated with silica gel. Whether prepared by this method or by some modification thereof, the catalyst will contain a major portion of silica, and a minor portion of metal oxide. This minor portion of metal oxide, such as alumina, will generally not be in excess of 10% by weight, and will more often, and generally more preferably, be between about 0.1 and 1.5 or 2% by weight.

In the above-outlined procedure, the starting materials are usually chosen from the water-soluble silicates and the commercially available mineral acids. Sulfuric and hydrochloric acids are preferred on economic grounds, although any acid may be used which will provide suitable hydrogen ion concentration and form a silica hydrogel of proper consistency. Thus, phosphoric, acetic, nitric, and boric acids may be used in certain instances. The gel formed should be partially dried and washed free of excess acid prior to activiation, and the extent of drying is carefully controlled since the eventual catalyst activity is apparently somewhat dependent on the maintenance of the hydrous oxide composition prior to the activation treatment. The salt solution for activation may be prepared from any water-soluble, hydrolyzable salt of one or more of the metals indicated, with the sulfate or chloride being preferred. Other alternate salts include acetates, and nitrates. The adsorption of the hydrous oxide by the silica gel proceeds smoothly with hydrated silica gel, whereas with dried silica the adsorption and the activation may be much less satisfactory. Active catalysts are preferably rinsed free of the salt solution and a moderate concentration effect or "curing" may be obtained by partial drying of the rinsed gel. The final washing then serves to remove unadsorbed salts and free acid, and the final drying which is performed at moderate temperatures produces hard, brittle granules of gel containing negligible quantities of compounds other than silica and the metal oxide or oxides.

Modifications may be made in the foregoing procedure and catalysts of suitable activity may result. One obvious alternative is the addition of the salt to the silicate before gelation. This method enables the incorporation of greater proportions of metal oxide, but activity may not be proportional to increasing metal oxide contents above about 1 to about 15 weight percent so that little is gained by the modification and the proper degree of salt and acid removal may be more difficult. Non-uniform materials usually result from the mechanical mixing of hydrous metal oxide and silica gels, so that catalysts prepared in this manner may be less satisfactory. Other means of accomplishing the preparation may be devised, however, in view of the foregoing description.

As indicated above, the finished gel-type catalysts comprise essentially silica and metal oxide with variant quantities of water. The metal oxide may be present in minor activating quantities of about 1 to about 15 weight percent of the total oxides. In many instances, catalytic activity may be as great with about 1 to 5 percent of metal oxide as with about 10 to 15 percent. Still greater amounts up to about 50 weight percent may be added if desired, although the physical characteristics and activity of the catalyst may, at times, be adversely affected. In order to retain the selectivity of the catalyst for the present reaction, other heavy metal oxides or salts are usually absent from the starting materials and the finished gel. The catalyst is generally used as relatively coarse granules within a range of about 4 to about 20 mesh, but may be used as a fine powder in suspension in the reacting stream.

The activity of the catalysts prepared by this method is usually enhanced in the present process by a mild dehydration treatment at temperatures of about 200 to about 300 F. just prior to introduction of the hydrocarbon feed. The dehydration is usually accomplished by passing a stream of an inert hydrocarbon or other gas through a catalyst bed at the designated low temperatures. This dehydration may, of course, be accomplished gradually during operation through the agency of the feed mixture, but an initial period of somewhat low conversion may result. Prior to this step, drying temperatures in the catalyst preparation procedure are not usually higher than subsequent initial operating temperatures.

The hydrocarbon feed passed over the catalyst, or otherwise reacted in contact with the catalyst, comprises benzene and ethylene in a controlled mol ratio which is chosen with regard to the desired alkylate composition. In order to produce predominantly mono-alkylate, it is desirable to employ an excess of benzene to reduce the ethylene concentration and the probability of further reaction of ethylene with the ethylbenzene. However, the huge excesses of benzene favored by the prior art are not necessary in the present process, and high yields of mono-alkylate result from the use of a moderate excess of benzene in the catalyst zone. Satisfactory reaction mixtures may contain benzene-ethylene mol ratios of between about 1:1 and 10:1, with an intermediate value of about 4:1 apparently very suitable from the standpoint of economical operation. Ratios lower than about 1:1 produce large amounts of heavy alkylate.

The temperature within the catalyst bed is chosen to conform to the catalyst activity, the feed composition, the operating pressure, and the contact or reaction time in order to secure most efficient conversion. Suitable temperatures over the range of preferred operating conditions are usually within the range of about 400 to about 700 F., with a somewhat narrower range of about 450 to about 550 F. preferred. Still higher temperatures above 700 F. may, of course, be employed, although the effect is to reduce the selectivity of reaction and with the extremely active catalysts described, the higher temperatures are usually less efficient and less desirable. When feed mixtures containing a large excess of benzene and relatively high flow rates are used, somewhat higher temperatures in the stated range may be employed. On the other hand, with extremely active catalysts, low benzene-ethylene mol ratios and longer contact times, the most advantageous temperatures may be in the range of about 475 to 520 F. The interdependence of these factors will be evident to those skilled in the art, and optimum conditions for individual applications may be determined by experiment.

Since the alkylation reaction is exothermic, means for dissipating any excess heat and preventing temperatures from rising above the preferred range are ordinarily provided. Such means may include cooling the catalyst bed by internal or external heat exchange apparatus, or more conveniently by reducing the amount of preheat supplied to the feed ahead of the catalyst. Excessive temperatures may increase the yield of polyalkylated products, or may increase the rate of deposition of carbonaceous residue on the catalyst surface, whereby catalyst life is decreased. In general, the catalyst is maintained in the beginning at the lowest temperatures which satisfactorily support alkylation with the feed composition and flow rate employed. A gradual decline in catalyst activity with use can often be offset and reaction rate maintained at suitable levels by gradually and progressively increasing the operating temperature within the specified range. However, if the temperature increases are continued to the point that the proportions of polyalkylate and/or polymer are greatly increased, continuance of this method of prolonging catalyst life may become uneconomical and a more active catalyst mass should be placed into operation.

Catalyst life in the present process is ordinarily very long, since the relatively low temperatures and the preferred liquid-phase operation both tend to prevent the accumulation of tarry poisons and carbonaceous deposits. Thus, several hundred volumes of alkylate may often be produced per volume of catalyst before any significant change in activity is evident. The catalyst is not retained in service after conversion declines seriously and/or excessive temperatures are required for satisfactory reaction rates. The spent catalyst may be replaced and treated for reactivation or recovery of the ingredients.

Operating pressures are chosen in accordance with reaction requirements and particularly with the reaction temperature. The alkylation is apparently promoted to some extent by pressure which may also increase the ethylene concentration. Thus increasing pressures seem to promote conversion and enable rapid reaction rates at somewhat lower temperatures and/or shorter contact times. The preferred pressures are usually in the range of about 100 to 2000 pounds gage, or, more specifically, those pressures which are required to maintain essentially liquid phase operation and/or produce suitable concentrations of ethylene in the benzene feed.

When temperature and pressure conditions are selected to conform to the catalyst activity and desired extent of conversion, rather high flow rates of reactants may be employed. Thus, with the preferred catalysts of this invention, flow rates through the reaction zone are ordinarily between about 0.1 and about 10 liquid volumes of feed per hour per volume of catalyst. These liquid flow rates, while providing excellent throughput of reactants per volume of catalyst, are not sufficiently high to cause packing, channeling, and pressure drop in a bed of granular catalyst having a particle size within a range of about 4 to 20 mesh.

The feed stocks for the process may be derived from any suitable sources, such as petroleum refining processes which produce both aromatics and olefin hydrocarbons, or from unrelated sources when process economics are favorable. When the present invention is utilized as a highly selective chemical synthesis, it is advantageous to employ benzene of relatively high purity and ethylene of corresponding purity or in gaseous mixtures with substantially inert compounds such as ethane. The use of relatively pure benzene also results in longer catalyst life and purer products since the presence of impurities in the benzene boiling range may lead to the production of compounds of such boiling range to contaminate the alkylated products. Non-hydrocarbon impurities such as sulfur compounds are also objectionable because of possible contamination of the products.

The alkylating agent may be high purity ethylene, or if this is not available or economical, $C_2$ mixtures may be employed. In this case, the ethane merely acts as an inert diluent and can be handled satisfactorily by perhaps increasing the concentration of $C_2$ hydrocarbons in the feed and then providing for removal of the ethane from the liquid products at some point chosen to interfere least with the subsequent fractionation steps. Appreciable amounts of methane and lighter gases which necessitate higher pressures in the catalyst vessel are undesirable. However, it is generally desirable to have other unsaturated hydrocarbons, such as acetylene and propylene, substantially absent.

The subsequent handling of the alkylate produced will depend largely on the intended uses for the products. In some instances, a substantially pure ethylbenzene may be required for inclusion in high octane motor fuels, and the purity of the aromatic additive may be governed by the existing fuel specifications. In other uses, the purity may be governed more by other economic considerations.

The heavy alkylate produced by the process consists essentially of di-ethylbenzene, and this product may be isolated in high purity as is the mono-alkylate. Subsequent uses of the di-ethylbenzene may be selected on the basis of the greatest return from its utilization. Possible uses include treatment to convert the di-alkylate largely to mono-alkylate, or addition of the di-alkylate to motor fuels within the limits allowed by fuel specifications.

In order to further illustrate the specific uses and advantages of the present invention, the following exemplary operations will be described. However, since these and numerous other process modifications will be obvious in the light of the foregoing disclosure, no undue limitations are intended.

*Example I*

A silica-alumina gel-type catalyst was prepared by the steps of (1) forming silica hydrogel by introducing sodium silicate solution into excess sulfuric acid; (2) washing and partially drying the gel to a $SiO_2:H_2O$ ratio between one and two; (3) activating the partially dried gel by boiling in a solution of iron-free aluminum sulfate; (4) washing the activated gel to remove free acid and salts and finally drying to form hard, glassy granules. This catalyst was used in 12/20 mesh size to alkylate benzene with ethylene.

The feed mixture contained ethylene dissolved in benzene under about 400 pounds gage pressure to give a benzene-ethylene mol ratio of about 5:1. The feed was preheated to 500° F. and passed through the catalyst at the above-mentioned pressure and at a flow rate of 1.3 liquid volumes per hour per volume of catalyst, which corresponds to a reaction time of about 46 minutes. The reaction proceeded to substantially complete conversion of all of the ethylene reacted to ethyl derivatives of benzene over a prolonged operating period. Liquid products from the catalyst chamber were collected at lowered pressures and fractionated. The approximate composition was as follows:

| Compound | Liquid Volume Percent |
|---|---|
| Benzene | 85.4 |
| Ethylbenzene | 11.0 |
| Diethylbenzene | 2.5 |

Under these conditions, the alkylated products contained about 81 percent of ethylbenzene. No unsaturates were present in the products indicating that ethylene polymerization and other side reactions were negligible. No evidence of catalyst decline was noted during the synthesis of over 100 volumes of alkylate per volume of catalyst.

*Example II*

A catalyst similar to that of Example I was used to alkylate benzene with ethylene in a feed mixture containing about three mols of benzene per mol of ethylene. The reaction was initiated at about 490 F. and 1000 pounds gage pressure, while the feed rate was between one and 1.5 liquid volumes per hour per volume of catalyst, corresponding to a reaction time between 60 and 40 minutes. During the operation, the reaction temperature was maintained between 490° and 520° F., while producing liquid products of the following approximate composition:

| Compound | Liquid Volume Per cent |
| --- | --- |
| Benzene | 75.5 |
| Ethylbenzene | 18.4 |
| Diethylbenzene | 5.4 |

The alkylate yield thus approached the theoretical, based on the ethylene charged, and the alkylate after removal of unconverted benzene for recycle contained about 77 percent of ethylbenzene.

*Example III*

A synthetic gel-type catalyst was prepared by activating partially dehydrated silica hydrogel with a hot solution of aluminum and zirconium chlorides. After washing free of acid, and water-soluble salts, and drying to hard granular gel form the catalyst contained silica, alumina, and zirconia in the approximate weight ratio of 95:4:1.

A charge mixture of benzene and ethylene in the mol ratio of 6:1 was passed over this catalyst at a flow rate of two liquid volumes per volume of catalyst per hour, which corresponds to a reaction time of 30 minutes. The temperature was maintained between 500 and 530 F. and the pressure was 800 pounds gage. Fractional distillation of the liquid effluent produced alkylate containing 86 percent ethylbenzene and the balance diethylbenzene when the ethylene was substantially completely reacted.

*Example IV*

A gel catalyst consisting of a major proportion of silica activated with a minor proportion of zirconia was prepared by mixed precipitation of the hydrous oxides. This catalyst, after washing to remove acid and water soluble salts and drying to hard granular form, was employed with a charge mixture similar to that of Example III. Alkylation was conducted at temperatures of 530 to 550 F. and the alkylate contained ethyl and diethylbenzene in a volume ratio of over 3:1.

While the foregoing discussion has been relatively specific to the alkylation of benzene, and benzene has been used to typify an alkylatable aromatic hydrocarbon, it will be apparent that this invention may also be applied to homologs of benzene such as toluene, xylene, ethylbenzene, and other alkyl benzenes to introduce additional ethyl groups. Other benzenoid compounds susceptible to alkylation include compounds in which one or more nuclear carbon atoms are attached to groups other than alkyl groups, such as phenols, halogen derivatives, etc. The benzenoid compound is preferably a liquid under the disclosed process conditions or, in some cases, may be present in solution in a suitable hydrocarbon or other substantially inert solvent. Aromatic compounds unstable under the treating conditions or tending to poison the catalyst through decomposition or other reactions are, of course, unsuitable in the process.

The foregoing disclosure has included detailed descriptions of the operation and the outstanding advantages of the process of this invention, and further illustrated specific applications thereof. Other applications and even combinations of this process with operations such as refining, conversion, and/or manufacturing steps to produce and/or utilize raw materials and/or products as set forth above will be discernible from the disclosure and valuable in proportion to the benefits thereof. Therefore the scope of the invention is limited only as defined in the following claims.

I claim:

1. An improved process for the production of ethyl benzene from benzene and ethylene which comprises passing a liquid stream of benzene and ethylene in such proportions that the molar ratio of benzene to ethylene is substantially in excess of 1:1 through a bed of solid granular adsorbent contact catalyst contained in a reaction zone and consisting of synthetic silica gel subsequently promoted by a minor proportion of alumina, said catalyst being prepared by forming a hydrous silica gel by introducing an alkali silicate solution into an excess of an acid and allowing the resulting mixture to set to a gel, water-washing said gel free of soluble material and partially drying to an extent so limited that the hydrous oxide composition of the gel is maintained, activating the resulting hydrous silica gel with an aqueous solution of a hydrolyzable aluminum salt and thereby causing adsorption of hydrous alumina on the silica gel in an amount corresponding to from 0.1 to 2% of alumina by weight, and water-washing and drying the treated gel, each said drying being conducted at a temperature not greater than the subsequent reaction temperature, maintaining a pressure such as to maintain liquid phase in the reaction zone, carrying out said contacting at a temperature of from about 400 to about 700° F. and at a flow rate of from 0.1 to 10 liquid volumes of feed per hour per volume of catalyst, and thereby effecting alkylation of said benzene with said ethylene and the production of mono-ethyl benzene as the principal reaction product.

2. The process of claim 1 wherein the benzene-ethylene mol ratio is approximately 4 to 1.

3. The process of claim 1 wherein said temperature ranges from 450 to 550° F.

4. The process of claim 1 wherein said temperature is low initially and is raised progressively throughout the on-stream period as the catalyst activity declines.

5. The process of claim 1 in which the acid used in preparation of said hydrous silica gel is sulfuric acid and in which said hydrolyzable aluminum salt used in activating said silica gel is aluminum sulfate.

6. An improved process for the production of monoethyl benzene from benzene and ethylene, which comprises passing a liquid stream of benzene and ethylene in such proportions that the molar ratio of benzene to ethylene is substantially in excess of 1:1 through a bed of solid granular absorbent contact catalyst contained in a reaction zone and consisting of synthetic silica gel subsequently promoted by a minor proportion of alumina, said catalyst being prepared by forming a hydrous silica gel by introducing an alkali silicate solution into an excess of an acid and allowing the resulting mixture to set to a gel, water-washing said gel free of soluble material and partially drying to an extent so limited that the hydrous oxide composition of the gel is maintained, activating the resulting hydrous silica gel with an aqueous solution of a hydrolyzable aluminum salt and thereby causing absorption of hydrous alumina on the silica gel in an amount corresponding to from 0.1 to 2 per cent of alumina by weight, and water-washing and drying the treated gel, each said drying being conducted at a temperature not greater than the subsequent reaction temperature, maintaining contents of said reaction zone under conditions of temperature and pressure such as to promote union of ethylene and benzene to form monoethyl benzene and introducing said reactants at a flow rate of from 0.1 to 10 liquid volumes of feed per hour per volume of catalyst, and recovering from effluents of said reaction zone a hydrocarbon fraction comprising monoethyl benzene so produced.

7. An improved process for the production of a monoethyl derivative of an alkylatable aromatic hydrocarbon, which comprises passing a hydrocarbon mixture comprising ethylene and a molar excess of an alkylatable aromatic hydrocarbon through a bed of a solid granular catalyst under conditions of temperature and pressure such as to promote union of ethylene and said aromatic hydrocarbon to form a monoethyl derivative thereof as the principal reaction, said granular catalyst comprising silica and at least 0.1 but not more than about 2 per cent by weight of alumina, and prepared by passing an aqueous alkali silicate into an excess of an aqueous mineral acid and allowing the mixture to set to a silicic acid gel, washing said gel with water and only partially drying same to form a hydrous acidic silica gel, contacting said silica gel with an aqueous solution of a hydrolyzable aluminum salt at a temperature approximating the boiling point of said solution to activate said gel, washing said activated gel with water to remove free acid and salts, and finally drying said activated and washed gel to form hard granules, each said drying being conducted at a temperature not greater than the subsequent reaction temperature, and recovering from effluents of said catalyst bed a fraction comprising a monoethyl derivative of said aromatic hydrocarbon so produced.

8. The process of claim 7 in which said mineral acid is sulfuric acid and in which said aluminum salt is aluminum sulfate.

9. An improved process for the production of a monoethyl derivative of an alkylatable aromatic hydrocarbon, which comprises passing a hydrocarbon mixture comprising ethylene, and a molar excess of an alkylatable aromatic hydrocarbon through a bed of a solid granular catalyst under conditions of temperature and pressure such as to promote union of ethylene and said aromatic hydrocarbon to form a corresponding monoethyl derivative thereof as the principal reaction, said granular catalyst comprising silica and from 0.1 to 2 per cent by weight of an oxide of a metal selected from groups IIIB and IVA of the periodic system and prepared by introducing an aqueous solution of an alkali silicate into an excess of a mineral acid and allowing the resulting mixture to set to form a silicic acid gel, washing said gel with water and only partially drying same to form a hydrous acidic silica gel, contacting the resulting silica gel with an aqueous solution of a hydrolyzable salt of a metal selected from groups IIIB and IVA of the periodic system to activate same by absorption of a hydrous oxide of said metal thereon, and subsequently washing and drying the resultant activated material to form said granular catalyst, each said drying being conducted at a temperature not greater than the subsequent reaction temperature, and recovering from effluents of said catalyst bed a fraction comprising a monoethyl derivative of said aromatic hydrocarbon so produced.

WALTER A. SCHULZE.

REFERENCES CITED

The following references are of record in the file of this patent:

UNITED STATES PATENTS

| Number | Name | Date |
|---|---|---|
| 1,953,702 | Davidson | Apr. 3, 1934 |
| 2,115,884 | Schollkopf | May 3, 1938 |
| 2,147,985 | McKinney | Feb. 21, 1939 |
| 2,215,305 | Voorhies | Sept. 17, 1940 |
| 2,290,211 | Schaad | July 21, 1942 |
| 2,259,723 | Ballard et al. | Oct. 21, 1941 |
| 2,268,110 | Connolly | Dec. 30, 1941 |
| 2,317,803 | Reeves et al. | Apr. 27, 1943 |
| 2,329,858 | Schmerling et al. | Sept. 21, 1943 |
| 2,016,271 | Buell et al. | Oct. 8, 1935 |
| 2,031,600 | Harrison et al. | Feb. 25, 1936 |
| 2,241,430 | Snow | May 13, 1941 |
| 2,245,734 | Subkow | June 17, 1941 |
| 2,352,200 | Ipatieff | June 27, 1944 |
| 2,129,649 | Cross | Sept. 13, 1938 |
| 2,349,904 | Hachmuth | May 30, 1944 |
| 2,364,762 | Schmerling et al. | Dec. 12, 1944 |
| 2,384,505 | Thomas et al. | Sept. 11, 1945 |

FOREIGN PATENTS

| Number | Country | Date |
|---|---|---|
| 316,951 | British I | Nov. 6, 1930 |
| 504,614 | British II | Apr. 24, 1939 |
| 456,637 | British | Nov. 12, 1936 |

OTHER REFERENCES

Sachanen et al., Ind. and Eng. Chem., 33, 1540-4 (1941), 260-671.